2 Sheets—Sheet 1.

J. B. OLIVER.

FIRE PLOW.

No. 10,909. Reissued Mar. 13, 1888.

*Witnesses.*

G. G. Conner Jr.

Geo. Evarance.

*Inventor.*

James B. Oliver,
by M. Bakewell & Son
his Attorneys

N. PETERS, Photo-Lithographer, Washington, D. C.

2 Sheets—Sheet 2.
J. B. OLIVER.
FIRE PLOW.
No. 10,909. Reissued Mar. 13, 1888.
Fig. 3.
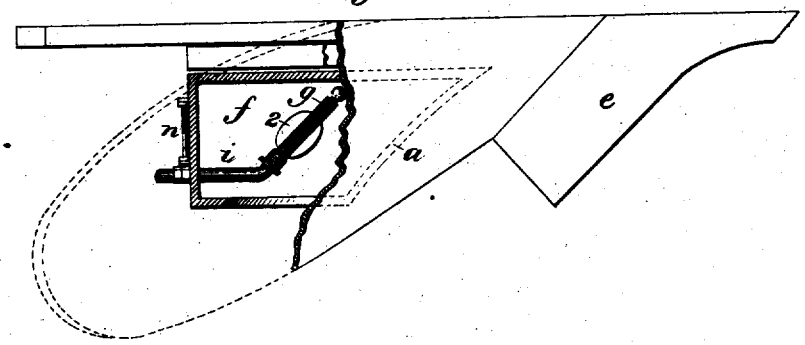
Fig. 5.
Fig. 4.
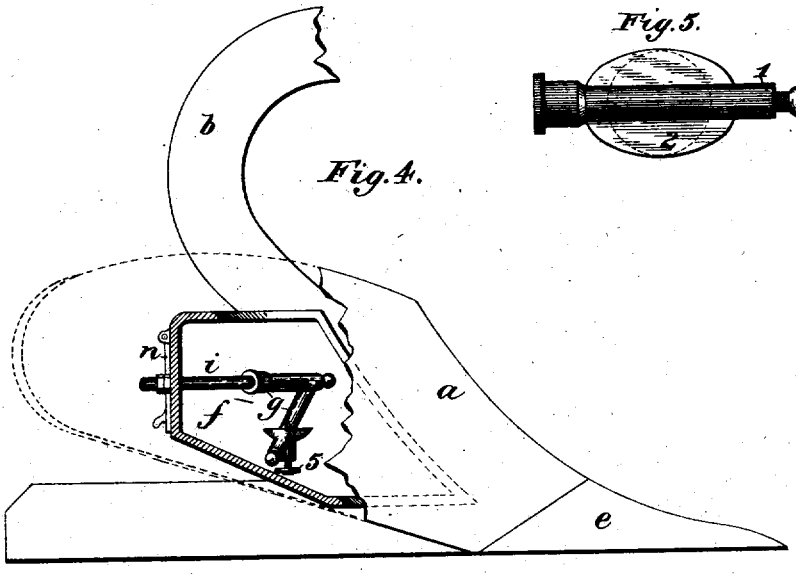
Fig. 6.
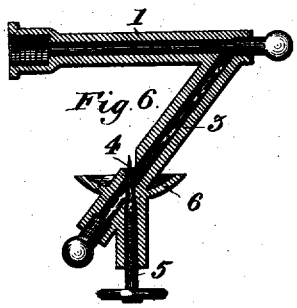
Witnesses.
L. G. Conner Jr.
Severance.
Inventor.
James B. Oliver.
by W. Bakewell & Son
his Attorneys
N. PETERS, Photo-Lithographer, Washington, D. C.

UNITED STATES PATENT OFFICE.

JAMES B. OLIVER, OF PITTSBURG, PENNSYLVANIA.

FIRE-PLOW.

SPECIFICATION forming part of Reissued Letters Patent No. 10,909, dated March 13, 1888.

Original No. 364,768, dated June 14, 1887. Application for reissue filed December 10, 1887. Serial No. 257,554.

*To all whom it may concern:*

Be it known that I, JAMES B. OLIVER, of Pittsburg, in the county of Allegheny and State of Pennsylvania, have invented a new and useful Improvement in Fire-Plows; and I do hereby declare the following to be a full, clear, and exact description thereof.

My invention relates particularly to that class of plows commonly known as "fire-plows," used in certain soils of a sticky nature, which experience has demonstrated will not adhere to the surface of the mold-board if the latter is in a heated condition. The former construction was to have a fire-chamber with a grate, in which solid fuel was used, attached to the mold-board. This construction, however, while effective for the purpose, was troublesome and defective, owing to the inconvenience of maintaining the fire, the size of the combustion-chamber, which caused it to be set so low as to interfere with the depth of the furrow, and, finally, by reason of the trouble of disposing of the products and residuum of combustion.

My invention is designed to obviate all these difficulties and to secure a steady and constant heating of the mold-board for any desired period of time.

To enable others skilled in the art to make and use my improvement, I will now describe it by reference to the accompanying two sheets of drawings, in which—

Figure 1:
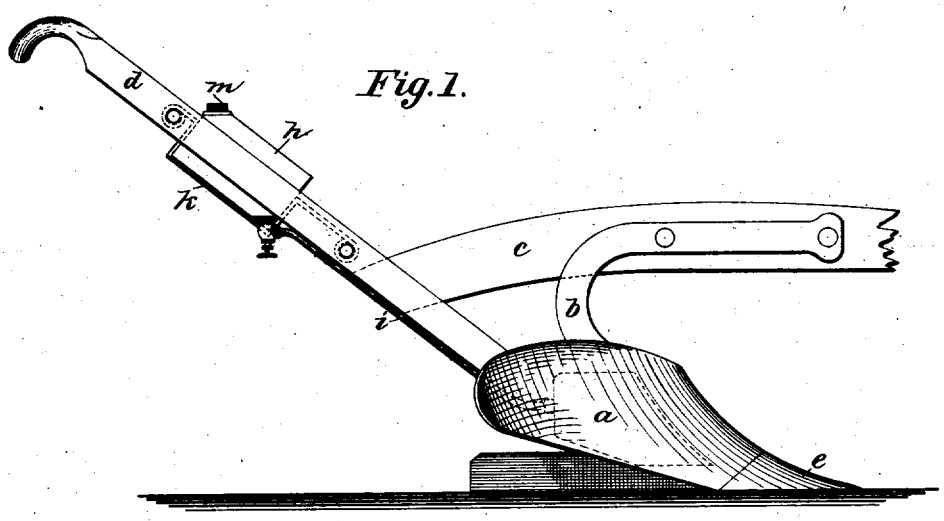
Figure 2:
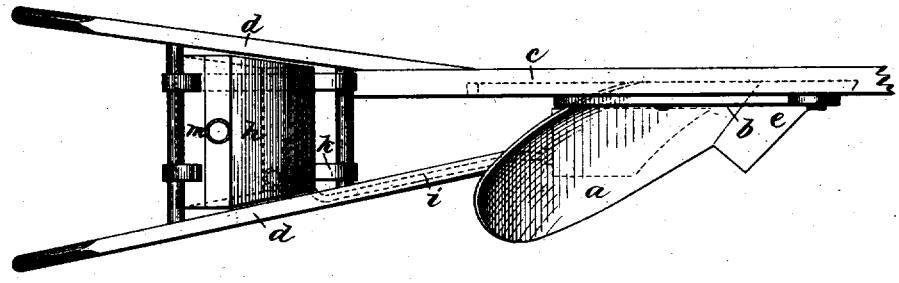

Figure 1 is a side elevation of a plow provided with my improvement. Fig. 2 is a plan view of the same. Fig. 3 is an enlarged plan view, partly in section. Fig. 4 is a side view of Fig. 3, partly in section. Fig. 5 is a plan view of the vapor-burner. Fig. 6 is a vertical longitudinal section of the same.

Like letters of reference indicate like parts in each.

The plow with which I have illustrated my improvement is of a common well-known form, having a mold-board, *a*, standard *b*, beam *c*, handles *d*, and share *e*. Secured to the mold-board *a*, and immediately in the rear of the same, or to any other part of the plow by which it may be supported in that position, is a box or chamber, *f*. In the chamber *f* is a suitable vapor-burner, *g*, which supplies the heat necessary for heating the mold-board up to the proper temperature to prevent the adhesion thereto of the sticky soil with which the plow is designed to be used. The vapor-burner *g* is connected with and receives the oil or other combustible liquid, with which it is supplied from a tank or holder, *h*, by means of a pipe, *i*. The holder *h* is supported between the handles of the plow by suitable braces, *k*, or other fastening and supporting devices, and it is furnished with a filling-aperture, *m*, closed by a suitable cap. The pipe *i* leads out of the bottom of the holder through the side of the box *f* to the burner *g* by any desired course or arrangement.

I make no claim to the construction of the burner, as that forms no part of my invention.

The metal burner *g*, which I show in the drawings, is fitted for use with ordinary illuminating petroleum-oil, as well as with the lighter distillates—such as benzine, naphtha, &c.—and therefore I prefer to use it. It consists of a horizontal pipe, 1, to which the supply-pipe *i* is connected, a disk, 2, secured to the pipe *i*, a down-pipe, 3, a burner-opening, 4, an adjusting screw or needle, 5, and a lighting-saucer, 6. In the use of this burner a little oil or fluid is first placed in the saucer 6 and ignited. This causes the burner to become sufficiently heated to vaporize the oil coming through the pipes. The burner is then lighted, and the flame, striking on the bottom of the disk 2, heats up the latter and the pipe 1 sufficiently to vaporize the oil. A door, *n*, is provided in the side of the box *f* to give access to the burner for the purpose of regulating it, and the door or sides of the box are properly perforated to admit air to support combustion. The bottom of the box is made with an upward curve or inclination, so as not to interfere with the descent of the plow into the earth, whereby a deep furrow may be made, as with an ordinary plow.

The burner *g* generates a steady constant heat, which may be raised or lowered at pleasure by means of the adjusting-screw 5. No trouble is experienced in regard to products or residuum of combustion, as there is practically no smoke or unconsumed vapor, and no cinders or ashes are made. The holder is not so large as to have an inconvenient bulk, and is placed in a position where it is not in the way, and being tightly closed, except the usual small aperture to admit air, so that the liquid will feed, it is not liable to spill its contents in the ordinary use of the plow.

While I have described the use of my improvement with a box or chamber arranged back of the mold-board, I do not desire to limit myself thereto, as for some purposes and in some localities the burner can be used with good results without the inclosing box or chamber. It should, however, be supported by suitable steadying-braces to prevent the shocks and jars occasioned by the movement of the plow from shaking it loose from the supply-pipe *i*. This last-named construction can be applied to plows now in use without great expense and trouble, whereas it would be somewhat difficult to apply the chamber *f* to an old plow.

I am aware that it is not new to apply heat to the mold-board of plows, as this has been done by means of a fire-box, and also by steam-pipes leading from a boiler carried on the frame of the plow. By my improvement, however, the complicated devices of the steam-heating apparatus are dispensed with, and a constant source of heat is carried by the plow without materially increasing the weight or in any way interfering with the practical utility of the plow itself, and at the same time an equal and regulable heat may be imparted to the mold-board whenever this heat is required.

What I claim as my invention, and desire to secure by Letters Patent, is—

1. As an improvement in fire-plows, the combination of the mold-board, a vapor-burner attached to the plow back of the mold-board, and a fluid-reservoir communicating with the vapor-burner, substantially as and for the purpose specified.

2. A plow provided with a vapor-burner arranged back of the mold-board, a holder for containing oil or other combustible fluid, supported on the frame of the plow, and a pipe connecting the holder with the burner, substantially as and for the purposes described.

3. A plow provided with a box or chamber arranged back of the mold-board, a vapor-burner arranged in said chamber, and an oil-receptacle connected with the vapor-burner by suitable supply-pipes, substantially as and for the purposes described.

4. A plow provided with a heating-chamber back of the mold-board, said chamber having an upwardly-inclined bottom, substantially as and for the purposes described.

In testimony whereof I have hereunto set my hand this 6th day of December, A. D. 1887.

JAMES B. OLIVER.

Witnesses:
ROBT. GARLAND,
WM. P. MESSNER.